United States Patent [19]
Gammill

[11] Patent Number: 4,791,750
[45] Date of Patent: Dec. 20, 1988

[54] FISHING LURE WITH INTERNAL RATTLE

[76] Inventor: Roy M. Gammill, P.O. Box 136, Oak Grove, La. 71263

[21] Appl. No.: 168,242

[22] Filed: Mar. 15, 1988

[51] Int. Cl.⁴ .......................................... A01K 85/00
[52] U.S. Cl. ................................................ 43/42.31
[58] Field of Search ................. 43/42.31, 42.36, 42.37, 43/42.39

[56] References Cited

U.S. PATENT DOCUMENTS

| | | | |
|---|---|---|---|
| 3,044,207 | 7/1962 | Dorsett | 43/42.31 |
| 3,935,660 | 2/1976 | Plew | 43/42.31 |
| 3,988,851 | 11/1976 | Sacharnoski | 43/42.31 |
| 4,054,004 | 10/1977 | Schott | 43/42.31 |
| 4,712,326 | 12/1987 | Hoover et al. | 43/42.31 |

*Primary Examiner*—M. Jordan
*Attorney, Agent, or Firm*—John M. Harrison

[57] ABSTRACT

A fishing lure which is characterized by a molded lure body such as a lead jig head and a non-magnetic metal cylinder or capsule provided with at least one non-magnetic ball therein, the capsule inserted in a cavity provided in the jig head, in order to produce a sound of desired intensity and resonance and attract fish when the fishing lure is retrieved. In a preferred embodiment the jig head is fitted with a flexible tail and is molded with an internal cavity of appropriate size for receiving an aluminum or stainless steel capsule which is constructed with an open end for inserting a selected number of spherical brass, bronze or stainless steel balls and a plug or cap for sealing the open end of the capsule when the capsule is inserted in the cavity. The number of spherical balls utilized in the aluminum or stainless steel capsule depends upon the size of the capsule, which size is, in turn, determined by the size of the jig head in which the capsule is inserted.

21 Claims, 1 Drawing Sheet

FISHING LURE WITH INTERNAL RATTLE

BACKGROUND OF THE INVENTION

Field of the Invention

This invention relates to fishing lures and more particularly, to fishing lures having an internal rattle mechanism for attracting fish when the lures are retrieved. The fishing lures are each typically characterized by a small lead jig head or body portion having a hook molded therein for taking fish such as crappie, bass and like game fish, and the lures are commonly fished using a fly rod. Each fishing lure is normally provide with a multi-colored tail portion which may be constructed of plastic, feathers, hair or like flexible material, in order to further attract fish. A non-magnetic metal tube or capsule is inserted in a cavity shaped in the lure body and receives one or more spherical, non-magnetic metal balls, to create rattle when the lure is retrieved.

In recent years, the sport of fishing has evolved into a multi-million dollar industry, with millions of dollars spent annually on boats, fishing tackle and lures. With the increased interest and emphasis on taking such popular game fish as black bass, crappie and the like, came a rapid expansion in the development and marketing of improved fishing tackle and new baits and lures in particular. Perhaps the most effective of all artificial lures, particularly in taking crappie, is the popular "jig" which is characterized by a shaped lead jig head having a hook molded therein and a tail which is constructed of feathers, hair or a flexible plastic material, in non-exclusive particular.

The development of shaped jig heads and jig-type lures which closely simulate life-like creatures such as grubs and the like, along with the development of modern lead molding and injection-molding techniques for creating such life-like replicas, has resulted in remarkable innovation in the fishing industry. The creation of such new lures and auxiliary tackle for using them, which tackle includes light action, sensitive rods and high-strength monofilament line of small diameter, has resulted in a multi-million dollar lure industry. It has been found that lures of this design are highly effective in taking many varieties of game fish, in addition to crappie. Furthermore, the jig-type lures can be cheaply manufactured in volume quantities and are therefore relatively inexpensive and they are available in a variety of sizes, shapes, colors and designs for use under all fishing conditions. Many of these lures are used in cooperation with weed guard and hook configurations which vary in design, depending upon the size and category of fish to be taken. Typically, the jig head is molded with a hook of appropriate size embedded therein, such that the eye of the hook extends either through the front or top of the jig head and the hook extends rearwardly of the jig head, as desired. Such lures may be retrieved using a wide variety of rod actions, depending upon the type of fish sought, the water depth and the weather conditions. Jig heads can be further provided with "trailers" of rubber or plastic material and may be used with both fly rods and light-action rods, as desired.

Various fishing lures having balls mounted in the hollow interior thereof for attracting fish by a "rattling" action, are known in the art. Typical of these, lures is the fishing lure detailed in U.S. Pat. No. 2,659,176, dated Nov. 17, 1953, to H. R. Wenger. The Wenger lure is characterized by a shaped body portion having a hollow interior, with multiple balls provided in the hollow interior, in order to present a rattling action when the lure is retrieved. A similar fishing lure is detailed in U.S. Pat. No. 2,718,725, dated Sept. 27, 1955, to R. B. Thurman. This lure includes a plastic or wooden body having a cylindrically-shaped cavity therein and multiple ball seats provided in the lower portion of the cavity for receiving multiple balls located in the cavity. In an alternative embodiment of the invention, the cavity is characterized by a convoluted passage which includes multiple balls wherein for making a rattling noise when the lure is retrieved. U.S. Pat. No. 3,705,465, dated Dec. 12, 1972, to Andrew Charney, details a fishing lure having an elongated, hollow body which is constructed of a light-refracting plastic material and includes smoothly curved sidewalls which terminate at one or both ends and an oblique face to provide a circle of emitted light. The surfaces of the body are also provided with a pair of ribs extending substantially the full length of the bottom of the body, with relatively narrow, outwardly-facing, light-emitting surfaces disposed obliquely to the adjacent wall surfaces. Interiorly of the body is provided a rollable "knocker" ball, a spinner, or a quantity of salmon eggs. Another "Fishing Lure" is detailed in U.S. Pat. No. 3,757,455, dated Sept. 11, 1973, to James W. Strader. The fishing lure detailed in this patent is characterized by a body portion having a spinner on the front and rear, with each spinner designed such that it will rotate in the same direction as the other spinner. Means for varying the frictional hold on the spinners is also provided to vary the rate of spin of each spinner and to vary the rocking motion of the spinners in the water. This action flashes a pair of light-reflecting eyes and the lure produces a sound when retrieved, by causing balls mounted internally of the body to move within the body and hit one another. U.S. Pat. No. 3,988,851, dated Nov. 2, 1976, to Max Sacharnoski, discloses a "Fishing Lure Sound Producer". The sound producer includes a capsule which features a glass tube with closed ends and a plurality of freely rolling spherical balls provided in the glass tube for association with a fishing lure to produce sounds that attract fish to the lure without materially affecting the attitude of the lure or its course within or through the water. U.S. Pat. No. 4,432,156, dated Feb. 21, 1984, to James R. Gowing, details a "Fishing Lure for Surface Water Fishing", which includes an elongated body having a natural appearance and designed to simulate the swimming characteristics of a small bait fish. Multiple, movable weights are carried by the body within an elongated cavity adjacent the rear end of the body. The cavity and weights are constructed and arranged to permit the weights to move within the cavity and urge the body, while floating at rest, to an upstanding position. Upon retrieval of the body along the water surface, the weights move within the cavity to impart oscillation to the body about an elongated axis extending through the body in opposite directions to produce a rattling sound that attracts fish. U.S. Pat. No. 4,432,157, dated Feb. 21, 1984, to James R. Gowing, further details a "Fishing Lure" which includes an elongated body having a fishing line attached to a front end portion and a rearwardly and upwardly-extending hook carried by the rear end portion. Multiple, movable weights are mounted within a closed cavity provided in the body. The cavity and weights are formed and arranged to permit the weights to move within the cavity and cause the body to oscillate about an elongated axis extending above the longitudinal centerline of the lure and thus produce a unique sound, appearance and disturbance in the water, which attracts fish. U. S. Pat. No. 4,203,246, dated May 20, 1980, to Max Sacharnoski, details a closed glass tube containing multiple spherical balls, which tube can be inserted in various fishing lures, particularly of the injection-molded plastic variety, to help attract fish.

One of the problems associated with fishing lures which utilize spherical sound-producing means in a hollow interior located in a lure body is that of determining and using materials of construction which provide a sufficiently clear, loud and resonant sound to attract fish. This problem is magnified under circumstances where the jig head or lure body is very small and a rattle capsule provided therein for receiving one or more noise-producing spherical balls of selected composition must be small in diameter and length and is therefore influenced by such factors as magnetic activity and the corrosive properties of water vapor. It has surprisingly been found by experimentation that glass, plastic and ferrous metal capsules containing balls of the same or different composition will not produce the required clear and resonant sound characteristics because of the influence of water vapor, static electricity and/or magnetism, which factors adversely affect movement of the spherical ball or balls, either individually or with respect to each other, in the glass or metal vial. Furthermore, such non-metallic materials as glass, ceramic, zirconium and like materials are very light and, regardless of the size, number and consistency of the spherical balls used in a capsule of the same or different composition, the combination will not produce the satisfactory clear, resonant sound characteristics in such a small capsule or vial. Equally surprising is the discovery that an aluminum capsule loaded with one or more, and preferably two stainless steel balls yields a highly satisfactory, resonant sound when the capsule is inserted in a lead jig head and the jig head is retrieved.

Accordingly, it is an object of this invention to provide a new and improved fishing lure with internal rattle, which lure is characterized by a molded head portion provided with an internal cavity, an aluminum, stainless steel or other non-ferrous metal or substantially non-magnetic cylinder, vial or capsule fitted in the internal cavity and at least one spherical, nonmagnetic ball of selected composition provided in the capsule for traversing the capsule and striking the ends of the capsule, thereby producing a rattle having the desired sound characteristics.

Another object of this invention is to provide a new and improved crappie fishing lure provided with an internal rattle, which lure includes a small molded lead jig head provided with a tail portion, an embedded hook and an internal aluminum capsule of appropriate length and diameter and fitted with at least one spherical brass bronze, or stainless steel ball therein, which ball or balls are adapted to traverse the length of the capsule and generate a sound of selected intensity and resonance when striking each other and/or the ends of the capsule pursuant to retrieval of the lure.

Still another object of the invention is to provide a new and improved jig-type fishing lure which includes a molded jig head of selected size having a hook embedded therein, a tail portion designed to at least partially conceal the hook and an elongated, corrosion-resistant, non-magnetic metal capsule of corresponding size and diameter fitted in the jig head, with at least one corrosion-resistant, non-magnetic, spherical metal ball located in the capsule for traversing the capsule, striking the ends o the capsule and each other (in the case of multiple balls) and causing a rattling sound having an optimum resonance to project from the capsule and the lure when the lure is retrieved.

A still further object of the invention is to provide a new and improved crappie jig which includes a molded lead jig head of selected size and shape, having a hook embedded therein, a flexible plastic or fibrous tail portion attached to the jig head or hook shank, and an opening provided in the jig head for insertion of an aluminum or stainless steel cylinder or capsule of selected length and diameter, with at leas one non-magnetic, corrosion-resistant spherical metal ball located in the capsule for traversing the capsule and causing an optimum rattling action upon retrieval of the lure.

SUMMARY OF THE INVENTION

These and other objects of the invention are provided in a new and improved fishing lure with internal rattle, which fishing lure is characterized by a molded jig head of selected size, configuration, weight and color; a hook embedded in the jig head; a flexible tail member carried by the jig head or hook; an internal cavity provided in the jig head for receiving an aluminum, stainless steel or alternative non-magnetic, corrosion-resistant capsule having an open end and a length and diameter which is proportional to the size of the jig head; and a pair of non-magnetic, corrosion-resistant, spherical metal balls, such as brass, bronze or stainless steel balls located in the capsule for traversing the length of the capsule and an aluminum or stainless steel cap closing the open end of the capsule, wherein the balls strike the ends of the capsule and each other to produce an easily discernible, clear and resonant rattling action of desired intensity when the lure is retrieved.

BRIEF DESCRIPTION OF THE DRAWING

The invention will be better understood by reference to the accompanying drawing, wherein.

DESCRIPTION OF THE PREFERRED EMBODIMENTS

Figures 1, 2:
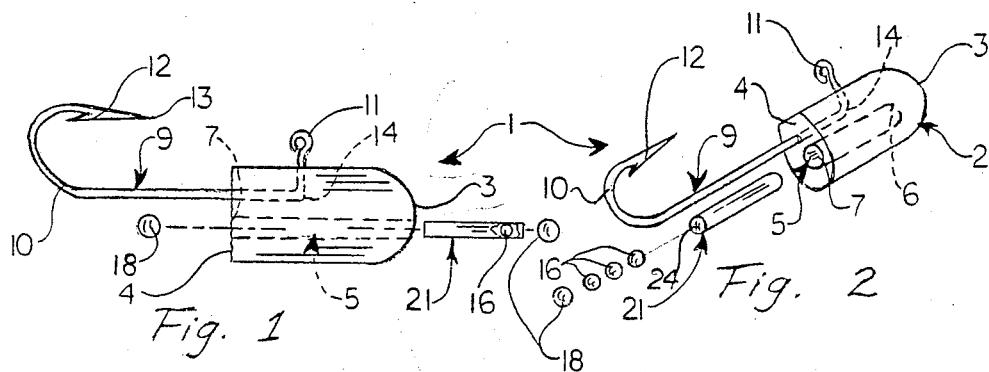
FIG. 1 is a side view of a first preferred embodiment of the fishing lure or jig head of this invention, wherein an open-ended cavity or tunnel is provided in the jig head for receiving a capsule or cylinder containing at least one spherical ball.
FIG. 2 is a perspective view of the fishing lure and jig head illustrated in FIG. 1, more particularly illustrating an alternative internal cavity having a closed end provided in the molded head element and a ball-receiving tube, capsule or cylinder designed for insertion in the cavity.

Referring initially to FIG. 1 of the drawing, the fishing lure of this invention is generally illustrated by reference numeral 1. The fishing lure 1 is characterized by a jig head 2, which is typically molded or shaped of lead and is characterized in a preferred embodiment, by a curved frontal portion 3 and a flat rear portion 4, as illustrated. Under normal circumstances, a tail portion or "skirt" (not illustrated) is attached to the jig head 2 and covers that portion of the hook shank 10 of the hook 9 which extends rearwardly of the jig head 2. However, for purposes of clarity, the tail portion is not illustrated in the drawing. The hook shank 10 of the hook 9 extends into the flat rear portion 4 of the jig head 2 and changes direction at the shank bend 14, to exit from the cylindrical side of the jig head 2 and a hook eye 11 terminates this laterally-projecting end of the hook shank 10. The opposite end of the hook shank 10 curves upwardly and forwardly and terminates in a conventional hook point 13. A hook barb 12 is shaped in the end of the hook shank 10 which lies adjacent to the hook point 13, as illustrated. A generally cylindrically-shaped head tunnel or cavity 5 is drilled, molded or otherwise provided in the jig head 2 and extends from the flat rear portion 4 at a cavity mouth 7 through the curved frontal portion 3. The head cavity 5 is of sufficient length and diameter to receive an open-ended rattle capsule 21 from either end thereof, in order to facilitate an internal rattle for the fishing lure 1. The rattle capsule 21 is designed to fit snugly inside the head cavity 5 and to receive the single spherical ball 16 therein and the cap balls 18 at each end for sealing purposes.

Figures 3, 4:
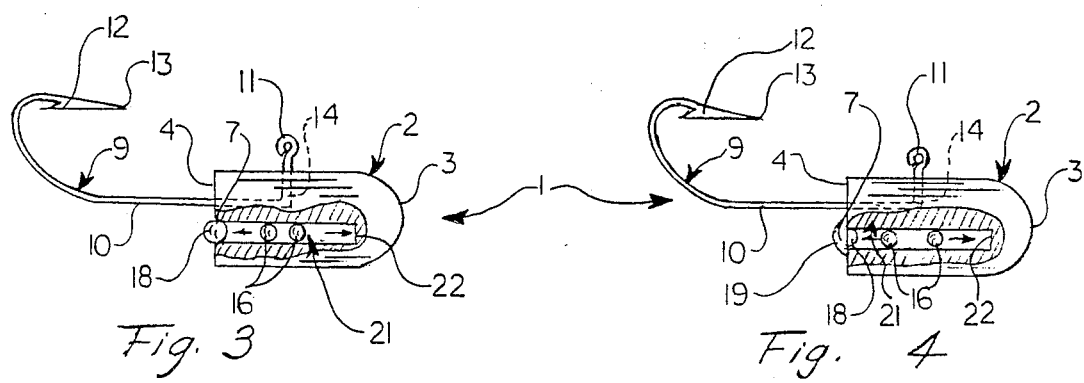
FIG. 3 is a side view, partially in section, of the fishing lure illustrated in FIG. 2, with an aluminum tube or capsule inserted in the jig head, and with multiple stainless steel or brass balls provided in the capsule and a cap ball sealing the open end of the capsule.
FIG. 4 is a side view, partially in section, of the jig head illustrated in FIG. 3, more particularly illustrating a seal applied to the protruding cap ball.

Referring now to FIGS. 2–4 of the drawing, the head cavity 5 is drilled or molded to a selected depth, defined by the cavity base 6, in the jig head 2 from the cavity mouth 7. The rattle capsule 21 is initially inserted in the head cavity 5 of the jig head 2 such that the sealed end of the rattle capsule 21 seats against the cavity base 6 and the open end of the rattle capsule 21 lies in the cavity mouth 7. Furthermore, a cap ball 18, having a diameter which is slightly larger than the open capsule mouth 24 of the rattle capsule 21, is tightly lodged in the capsule mouth 24, as illustrated in FIG. 3. If desired, the cap ball 18 can be glued in the capsule mouth 24 using a suitable glue or an epoxy material, as hereinafter further described. As further illustrated in FIG. 4, a seal 19, such as one of several epoxy materials well known to those skilled in the art, may then be applied over the protruding curvature of the cap ball 18 and the surrounding area of the flat, rear portion 4 of the jig head 2, in order to tightly seal the spherical balls 16 inside the rattle capsule 21.

Figures 5, 6:
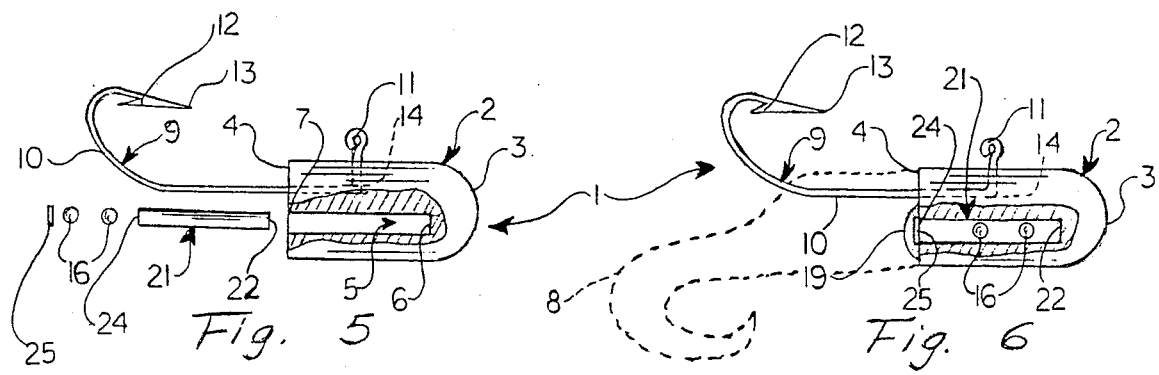
FIG. 5 is a side view, partially in section, of the jig head illustrated in FIG. 2, more particularly illustrating a preferred technique for inserting an aluminum capsule in the head cavity and sealing two spherical stainless steel balls in the capsule.
FIG. 6 is a side view, partially in section, of the jig head illustrated in FIG. 5, with a tail member added as illustrated in phantom and the aluminum capsule inserted in the head cavity, the stainless steel spherical balls located in the aluminum capsule and a seal applied to the jig head to seal the capsule in position inside the jig head.
Figure 7:
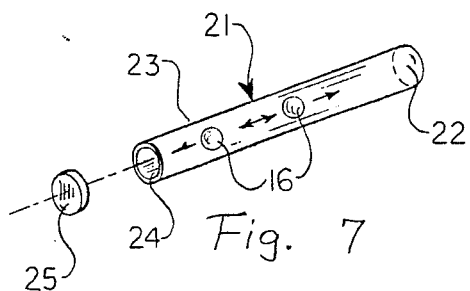
FIG. 7 is a perspective view of a preferred aluminum capsule fitted with a cap for sealing two brass, bronze or stainless steel balls inside the capsule.

Referring to FIGS. 5–7 of the drawing, in an alternative embodiment of the invention the fishing lure 1 is characterized by a head cavity 5, defined by the cavity base 6 and the cavity mouth 7, as heretofore described with respect to the fishing lure 1 illustrated in FIGS. 2–4. A rattle capsule 21 having a closed end 22 and an open capsule mouth 24 is fitted in the drilled or molded head cavity 5, with the closed end 22 of the rattle capsule 21 lying adjacent to and touching the cavity base 6 and the capsule mouth 24 lying adjacent to the cavity mouth 7 of the head cavity 5. The two spherical balls 16 are then loaded in the rattle capsule 21 and a round cap 25, having an inset to receive the capsule mouth 24, is glued or otherwise secured to the rattle capsule 21 to close the capsule mouth 24 and prevent the spherical balls 16 from rolling out of the rattle capsule 21. In a most preferred embodiment of the invention, the receiving end of the cap 25 is slightly larger in diameter than the outside diameter of the capsule mouth 24, such that at least a portion of the cap 25 overlaps the rattle capsule 21 at the capsule mouth 24 and is glued in place, as hereinafter further described. As illustrated in FIG. 6, a tail portion 8 is illustrated in phantom on the hook shank 10 of the hook 9. The tail portion 8 is typically constructed of a plastic material which is injection-molded into a desired shape, according to the knowledge of those skilled in the art. It will be appreciated that a wide variety of tail compositions, colors and lengths can be provided and used as the tail portion 8 in the fishing lure 1 of this invention. For example, multiple strands of rubber, nylon, hair and the like, can be secured to the jig head 2 or hook shank 10 to serve as the tail portion 8, according to the knowledge of those skilled in the art.

In yet another preferred embodiment of the invention, the rattle capsule 21 is preferably characterized by an aluminum or stainless steel cylinder having a wall 23 of selected thickness and fitted with a closed end 22, which may either be integrally formed with the rattle capsule 21 or added by gluing or welding, according to the knowledge of those skilled in the art. Furthermore, the cap 25 is also aluminum or stainless steel and is designed to enclose one or more brass, bronze or stainless steel spherical balls 16 inside the rattle capsule 21, in order to facilitate optimum noise intensity and resonance with minimum electrical, magnetic and/or corrosive water vapor interference between the rolling spherical balls 16 and the closed end 22 and cap 25 of the rattle capsule 21, respectively. In a most preferred embodiment, the aluminum cap 25 is constructed to tightly fit on the open end of the rattle capsule 21 so that no glue or welding is necessary. The rattle capsule 21 is then sealed inside the head cavity 5 by paint applied to the jig head 2. In a most preferred embodiment of the invention, and referring again to FIG. 7 of the drawing, in view of the high cost of fabricating stainless steel capsules of such small design, the rattle capsule 21 is constructed of a cylindrically-shaped aluminum capsule having a thin capsule wall 23, a closed end 22 and closed at the opposite end by an aluminum cap 25. The two enclosed spherical balls 16 are most preferably fabricated from No. 302 or No. 316, essentially non-magnetic stainless steel, in order to minimize electrical, magnetic and corrosive water vapor action and to optimize sound intensity and resonance. Furthermore, the rattle capsule 21 is most preferably about ⅜ of an inch in length, having an outside diameter of about 0.30 of an inch and the spherical stainless steel balls 16 are about 1/16 of an inch in diameter. Whereas at least one non-corrosible, essentially non-magnetic spherical stainless steel ball 16 is required, it will be appreciated by those skilled in the art that two such spherical balls 16 are preferred and more can be used, depending upon the length and desired sound intensity and resonance of the rattle capsule 21. In a most preferred embodiment of the invention wherein the length of the rattle capsule 21 is about ⅜ of an inch and the capsule is about 0.30 of an inch in diameter, two stainless steel spherical balls having a diameter of about 1/16 of an inch is preferred.

From a consideration of the fishing lure with internal rattle described herein, it will be appreciated by those skilled in the art that an aluminum rattle capsule 21 having the characteristics described above and loaded with at least one essentially non-magnetic stainless steel, spherical metal ball, can be used in a highly effective manner to provide a rattling noise in very small jig-type fishing lures. It is understood that while an aluminum rattle capsule 21 and a stainless steel ball system is preferred, other non-ferrous metal combinations can also be employed in lures of substantially any size, according to the teachings of this invention. For example, it has been found that the rattle capsule 21 can be constructed of other non-corrosive, non-magnetic metals such as brass or bronze, while the spherical balls 16 can be constructed of bronze, chrome and brass, by way of example, without encountering the undesirable static electricity, magnetic and water vapor influences which minimizes the desired sound intensity and resonance in the rattling action.

Accordingly, while the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A fishing lure with internal rattle, comprising a body portion having at least one hook provided therein; a cavity provided in said body portion; a non-magnetic metal capsule fitted in said cavity; and at least one non-magnetic, substantially spherical metal ball having a diameter which is less than the diameter of said capsule disposed in said capsule, whereby said ball rolls in said capsule to cause a rattling noise when said fishing lure is retrieved.

2. The fishing lure of claim 1 wherein said capsule is open at one end for insertion of said ball and further comprising plug means closing said one end of said capsule for sealing said ball inside said capsule.

3. The fishing lure of claim 2 further comprising sealing means provided on said body portion over said plug means for sealing said plug means in said capsule.

4. The fishing lure of claim 3 wherein:
(a) said capsule is constructed of aluminum and is open at one end for insertion of said ball, said plug means is an aluminum cap inserted on said one end for sealing said ball inside said capsule and wherein said sealing means substantially covers said aluminum cap; and
(b) said body portion is further characterized by a molded lead jig head having said hook molded therein and further comprising tail means carried by said jig head for attracting fish to said fishing lure.

5. The fishing lure of claim 4 wherein said at least one metallic, non-magnetic, substantially spherical metal ball further comprises a pair of non-magnetic, substantially spherical, stainless steel balls.

6. The fishing lure of claim 1 wherein said body portion is further characterized by a molded lead jig head having said hook molded therein and further comprising tail means carried by said jig head for attracting fish to said fishing lure.

7. The fishing lure of claim 1 wherein:
(a) said capsule is open at one end for insertion of said ball and further comprising plug means closing said one end of said capsule for sealing said ball inside said capsule; and
(b) said body portion is further characterized by a molded lead jig head having said hook molded therein and further comprising tail means carried by said jig head for attracting fish to said fishing lure.

8. The fishing lure of claim 1 wherein said capsule is sealed at both ends with said ball provided therein prior to insertion of said capsule in said cavity.

9. The fishing lure of claim 8 wherein said body portion is further characterized by a molded lead jig head having said hook molded therein, said at least one non-magnetic, substantially spherical metal ball is two non-magnetic, substantially spherical metal balls and further comprising tail means carried by said jig head for attracting fish to said fishing lure.

10. The fishing lure of claim 1 wherein said at least one non-magnetic substantially spherical metal ball further comprises a pair of non-magnetic, substantially spherical metal balls.

11. The fishing lure of claim 10 wherein said capsule is constructed of aluminum and is open at one end for insertion of said balls and further comprising an aluminum cap inserted on said one end for sealing said balls inside said capsule.

12. The fishing lure of claim 11 wherein said body portion is further characterized by a molded lead jig head having said hook molded therein, said balls are constructed of stainless steel and further comprising tail means carried by said jig head for attracting fish to said fishing lure.

13. The fishing lure of claim 10 wherein said capsule is sealed at both ends with said balls provided therein prior to insertion of said capsule in said cavity.

14. The fishing lure of claim 10 wherein said body portion is further characterized by a molded lead jig head having said hook molded therein, said capsule is constructed of aluminum, said balls are constructed of stainless steel and further comprising tail means carried by said jig head for attracting fish to said fishing lure.

15. The fishing lure of claim 1 wherein:
(a) said capsule is constructed of aluminum and is sealed at both ends with said metal ball provided therein prior to insertion of said capsule in said cavity; and
(b) said body portion is further characterized by a molded lead jig head having said hook molded therein and further comprising tail means carried by said jig head for attracting fish to said fishing lure.

16. The fishing lure of claim 1 wherein said cavity extends completely through said body portion and further comprising first plug means inserted in one end of said capsule and said cavity for sealing said ball inside said capsule and second plug means inserted in the opposite end of said cavity for sealing said capsule inside said cavity.

17. The fishing lure of claim 16 wherein said at least one non-magnetic, substantially spherical metal ball further comprises a pair of non-magnetic, substantially spherical metal balls.

18. A fishing lure with internal rattle, comprising a molded lead jig head; a hook molded in said lead jig head with a hook shank and point extending from one end of said jig head and a hook eye projecting from the side of said jig head; tail means carried by said jig head for attracting fish to said fishing lure; a cavity provided in said jig head; a generally cylindrically-shaped, non-magnetic metal capsule fitted in said cavity; and a pair of substantially spherical stainless steel balls provided in said metal capsule in rolling relationship, whereby said balls roll in said capsule to cause a rattling noise when said fishing lure is retrieved.

19. The fishing lure of claim 18 wherein said capsule is constructed of aluminum and further comprising an aluminum cap inserted on one end of said capsule for sealing said balls inside said capsule.

20. A fishing lure with internal rattle, comprising a molded lead jig head, a hook molded in said lead jig head with a hook shank and point extending from one end of said jig head and a hook eye projecting from the side of said jig head; a flexible tail carried by said jig head and covering at least a portion of said hook shank; a cavity provided in said jig head; a generally cylindrically-shaped, non-magnetic metal capsule fitted in said cavity; and a pair of substantially spherical stainless steel balls provided in said metal capsule in rolling relationship, whereby said balls roll in said capsule to cause a rattling noise when said fishing lure is retrieved.

21. The fishing lure of claim 20 wherein said non-magnetic metal capsule is selected from the group consisting of aluminum and stainless steel.

* * * * *